No. 759,301.

Patented May 10, 1904.

UNITED STATES PATENT OFFICE.

HELEN JOHNSTON McKEEL, OF CHICAGO, ILLINOIS.

COMPOSITION FOR TRANSFERRING PICTURES.

SPECIFICATION forming part of Letters Patent No. 759,301, dated May 10, 1904.

Application filed September 16, 1903. Serial No. 173,462. (No specimens.)

*To all whom it may concern:*

Be it known that I, HELEN JOHNSTON McKEEL, a citizen of the United States, residing at Chicago, in the county of Cook and State of Illinois, have invented a new and useful Composition for Transferring Pictures, of which the following is a specification.

This invention relates to composition for transferring pictures, prints, lithographs, photographs, and the like.

The object of the invention is to provide a composition of matter which is simple in the ingredients thereof, inexpensive of manufacture, and efficient for use in transferring pictures from one surface to another.

The invention consists, substantially, in the combination of ingredients hereinafter set forth, and finally pointed out in the appended claims.

In the transfer of pictures, prints, lithographs, photographs, pen-and-ink sketches, and the like from one surface to another difficulty has been experienced heretofore by reason of the fact that in the process of transfer the ink would run, thereby blurring the picture during the transfer, and hence resulting in a failure to secure a copy with clear-cut sharp outlines following the lines of the original. Moreover, it has been difficult, if not impossible, heretofore to effect an efficient transfer of a picture in colors, the coloring of the original running during the process of transfer, and hence blurring, and consequently spoiling, not only the original, but the reproduced facsimile thereof.

It is among the special purposes of my invention to provide a composition for transferring pictures or pen-and-ink sketches or drawings, whether in black and white or in colors or in a combination of colors, and whereby the transfer is a facsimile of the original, wherein the lines are clear cut and sharply defined and wherein the colors are transferred without blurring or running, thus producing in the transfer an exact facsimile of the original with all the tints and shades of coloring of the original.

In compounding a composition of matter in accordance with the principles of my invention I employ the following ingredients in about the proportions mentioned—namely, eighty (80) parts water, twenty (20) parts turpentine, five (5) parts of fatty acid, fatty oil or fats, and one (1) part of an alkali. I have experimented with a wide range of fats, fatty oils, or acids or oleaginous substances and with various alkalies or alkaline bodies or substances with varying degrees of success. For instance, I have employed in my experiments olive-oil, palm-oil, cottolene, lard, butter, butterine, cocoanut-oil, tallow, and for an alkali or an alkaline body or substance I have employed with varying degrees of success sodium chlorid, potassium chlorid, commercial soda, and commercial potash. The ingredients above enumerated are chemically united or combined together, as follows: The fatty oil, fat or oleaginous body, and the alkaline body or substance are thoroughly mixed in the water, the latter being brought to a boiling heat to facilitate the dissolving process and the intimate chemical union of these ingredients. When these ingredients are thoroughly dissolved, the liquor is permitted to cool for about ten minutes. Then the turpentine in the form of the ordinary commercial product is added and thoroughly mixed. The composition is then permitted to cool and is ready for use. It is in the form of a liquid of white milky appearance. If left to stand in the cool for any considerable length of time, there is a tendency of the ingredients to separate, so that before using the contents of the bottle or other receptacle containing the composition should be thoroughly shaken. I have found in practice that excellent results are secured when the fatty oils, fats, or oleaginous substance or body is combined with the alkali or alkaline body or substance into a chemical union in the form of soap, and I have experimented with various kinds and compositions of soaps—such as tallow soap, palm-oil soap, cocoanut-oil soap, soft-soap, and castile-soap—and the best results I have obtained from the use of castile-soap, using for such purpose the purest article obtainable in the market. In using castile-soap the parts are mixed in about the proportion of eight (8) pounds of water, two (2) pounds of turpentine, and one (1) pound of soap. I have found that about the same proportions should be observed in the use of other kinds of soap, the soap furnishing not only the oil or fat constituent of the composition, but also the alkali or alkaline constituent, either in the form of soda or potash. I do not desire, therefore, to be limited or restricted to the character of fat, fatty oil, or oleaginous substance or material employed, nor to any particular character of alkali or alkaline body or substance, nor to the particular form in which these ingredients may be obtained or combined together into a chemical union, as said ingredients may be used in their separated state or when combined together, as in the form of a soap.

In the process of effecting a transfer of a picture such picture or the paper containing the same is thoroughly saturated with the composition. This saturation may be effected in any suitable or convenient manner. I have found that this saturation may be effected in a desirable manner by applying the composition to the picture with a camel's-hair brush until thorough saturation is effected. Any surplus liquid should be carefully removed before the the transfer is attempted. The removal of the excess liquid may be effected in any suitable or convenient manner—as, for instance, by lightly blotting the picture after a saturation, so as to remove only the excess of the composition. The saturated picture is then placed face downward upon the surface of which the picture is to be transferred and then pressure is applied in any suitable or convenient manner, so as to produce some degree of frictional heat. I have found it convenient and effective to apply the pressure by rubbing over the back of the picture with some hard substance—such, for instance, as the bottom or side of the glass bottle containing the composition. Before applying such pressure, however, I have found it desirable to place over the picture a smooth dry sheet of paper—such, for instance, as a sheet of uncalendered paper. After thoroughly rubbing over the picture with the hard pressure device as above described, the picture is removed and the picture will have been transferred to the surface upon which it is to be received.

I have found in practice that a transfer such as above described may be made to or upon any suitable or convenient smooth surface—such, for instance, as paper, linen, silk, or other fabric or upon wood—and the transferred picture contains all the marks, lines, tints, shades, and coloring in sharply-defined outline of the original and without running or blurring of the colors. I have found that excellent results are secured in the case of transfer of pictures upon wood, thus applying to such surface an outline of the original picture, which may then be traced over in outline with an electric needle or other pyrography-tool, thereby giving to the transferred figure on the wood surface a cameo or raised and highly-ornamental effect, and, similarly, a picture transferred to silk, canvas, linen, or other fabric results in the production of a pattern or design for fancy-work, which, if in colors, reproduces all the tints and shades of the original. My invention, however, is not to be limited or restricted in respect of the uses to which it is to be put, as it is capable of a wide and extensive range of use for ornamental and other purposes for the transfer of photographs, pictures, prints, and the like, and for the making of designs for sofa pillows, cushions, art needle-work, pictures to be framed, or the like.

It will be observed that the composition is exceedingly simple and inexpensive of manufacture.

In use the presence of the turpentine in the composition seems to prevent the running of the colors or of the lines during the process of transfer and fixes the same in the transferred picture. The fat, fatty body, or substance employed seems to perform the function of a binder for holding the ingredients together, while the presence of the alkali seems to loosen the coloring-matter of the original picture to enable the colors thereof to be transferred.

Having now set forth the object and nature of my invention and the manner of compounding and using the same, I desire it to be understood that my invention is not to be limited or restricted in its scope to the exact details of proportion and ingredients named, as many variations therefrom and in the details thereof may readily occur to persons skilled in the art and still fall within the spirit and scope of my invention; but

What I claim as new and useful and of my own invention, and desire to secure by Letters Patent, is—

1. A composition for transferring pictures, comprising water, turpentine, a fatty oil or oleaginous body or substance, and an alkali, as and for the purpose set forth.

2. A composition for transferring pictures, comprising water, soap and turpentine, combined and mixed in about the proportions specified, as and for the purpose set forth.

3. A composition for transferring pictures, comprising water, castile-soap and turpentine, combined and mixed in about the proportions specified, as and for the purpose set forth.

4. The process which consists in subjecting a mixture of fatty oils or oleaginous substance, an alkali and water in about the proportions specified to the action of heat and thoroughly dissolving and mixing said ingredients, then permitting the liquid to cool, and then adding turpentine in about the proportions specified, and thoroughly mixing the composition, as and for the purpose set forth.

In witness whereof I have hereunto set my hand, this 14th day of September, 1903, in the presence of the subscribing witnesses.

HELEN JOHNSTON McKEEL.

Witnesses:
CHAS. H. SEEM,
S. E. DARBY.